(12) United States Patent
Aronowitz

(10) Patent No.: US 8,433,567 B2
(45) Date of Patent: Apr. 30, 2013

(54) COMPENSATION OF INTRA-SPEAKER VARIABILITY IN SPEAKER DIARIZATION

(75) Inventor: Hagai Aronowitz, Petah-Tikva (IL)

(73) Assignee: International Business Machines Corporation, Armonk, NY (US)

(*) Notice: Subject to any disclaimer, the term of this patent is extended or adjusted under 35 U.S.C. 154(b) by 380 days.

(21) Appl. No.: 12/719,024

(22) Filed: Apr. 8, 2010

(65) Prior Publication Data

US 2011/0251843 A1 Oct. 13, 2011

(51) Int. Cl.
*G10L 15/26* (2006.01)
(52) U.S. Cl.
USPC ........... 704/235; 704/236; 704/246; 704/247; 704/251; 704/252
(58) Field of Classification Search .................. None
See application file for complete search history.

(56) References Cited

U.S. PATENT DOCUMENTS

| | | | | |
|---|---|---|---|---|
| 5,687,287 | A * | 11/1997 | Gandhi et al. | 704/247 |
| 6,411,930 | B1 | 6/2002 | Burges | |
| 2008/0140399 | A1 | 6/2008 | Chung | |
| 2008/0249774 | A1 | 10/2008 | Kim et al. | |
| 2009/0319269 | A1 * | 12/2009 | Aronowitz | 704/243 |

FOREIGN PATENT DOCUMENTS

WO 0229785 4/2002

OTHER PUBLICATIONS

Rong Fu, Robust Speaker Diarization for Single Channel Recorded Meetings, published 2009, The University of York.*
Vesnicer and France Mihelič, "The Likelihood Ratio Decision Criterion for Nuisance Attribute Projection in GMM Speaker Verification", University of Ljubljana, Trzaska 25, 1000 Ljubljana, Slovenia, 2008.
Howard Lei and Eduardo Lopez-Gonzalo, "Two-Wire Nuisance Attribute Projection", 2009.
Tranter et al, "An Overview of Automatic Speaker Diarization Systems", IEEE, 2006.
Campbell et al, "Support Vector Machines Using GMM Supervectors for Speaker Verifcation", May 2006.
Xuan Zhu et al, "Improved Speaker Diarization Using Speaker Identification", 2005.
Gupta et al, "Combining Gaussianized/Non-Gaussianized Features to Improve Speaker Diarization of Telephone Conversations", IEEE Signal Processing Letters, vol. 14, No. 12, Dec. 2007.
Campbell et al, "Linear and Non Linear Kernel GMM SuperVector Machines for Speaker Verification", 2007.

* cited by examiner

*Primary Examiner* — Leonard Saint Cyr
(74) *Attorney, Agent, or Firm* — Daniel Kligler

(57) ABSTRACT

A method, system, and computer program product compensation of intra-speaker variability in speaker diarization are provided. The method includes: dividing a speech session into segments of duration less than an average duration between speaker change; parameterizing each segment by a time dependent probability density function supervector, for example, using a Gaussian Mixture Model; computing a difference between successive segment supervectors; and computing a scatter measure such as a covariance matrix of the difference as an estimate of intra-speaker variability. The method further includes compensating the speech session for intra-speaker variability using the estimate of intra-speaker variability.

20 Claims, 5 Drawing Sheets

COMPENSATION OF INTRA-SPEAKER VARIABILITY IN SPEAKER DIARIZATION

BACKGROUND

This invention relates to the speaker diarization. In particular, the invention relates to compensation of intra-speaker variability in speaker diarization.

Speaker diarization is the process of segmenting and labelling audio input according to speakers' identities. A speaker diarization system usually consists of a speech/non-speech segmentation component, a speaker segmentation component, and a speaker clustering component.

Speaker segmentation is the process of identifying change points in an audio input where the identity of the speaker changes. Speaker segmentation is usually done by modeling a speaker with a multivariate normal distribution or with a Gaussian mixture model (GMM) and assuming frame independence. Deciding whether two consecutive segments share the same speaker identity is usually done by applying a Bayesian motivated approach such as Generalized Likelihood Ratio (GLR) or Bayesian Information Criterion (BIC).

Speaker clustering is the process of clustering segments according to speakers' identity. Speaker clustering is usually based on either the BIC criterion or on Cross Likelihood Ratio (CLR).

Intra-speaker variability is the variation of characteristics in a single speaker's output. Compensating for intra-speaker variability can enable more accurate speaker segmentation and clustering.

BRIEF SUMMARY

According to a first aspect of the present invention there is provided a method for speaker diarization, comprising: dividing a speech session into segments of duration less than an average duration between speaker change; parameterizing each segment by a time dependent probability density function supervector; computing a difference between successive segment supervectors; and computing a scatter measure of the difference as an estimate of intra-speaker variability; wherein said steps are implemented in either: computer hardware configured to perform said identifying, tracing, and providing steps, or computer software embodied in a non-transitory, tangible, computer-readable storage medium.

According to a second aspect of the present invention there is provided a computer program product for speaker diarization, the computer program product comprising: a computer readable storage medium having computer readable program code embodied therewith, the computer readable program code comprising: computer readable program code configured to: divide a speech session into segments of duration less than an average duration between speaker change; parameterize each segment by a time dependent probability density function supervector; compute a difference between successive segment supervectors; and compute a scatter measure of the difference as an estimate of intra-speaker variability.

According to a third aspect of the present invention there is provided a system for speaker diarization, comprising: a processor; an intra-speaker variability estimator including: a speech divider for dividing a speech session into segments of duration less than an average duration between speaker change; a segment parameterizing component for parameterizing each segment by a time dependent probability density function supervector; a scatter measure component for computing a difference between successive segment supervectors and computing a scatter measure of the difference as an estimate of intra-speaker variability.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1:
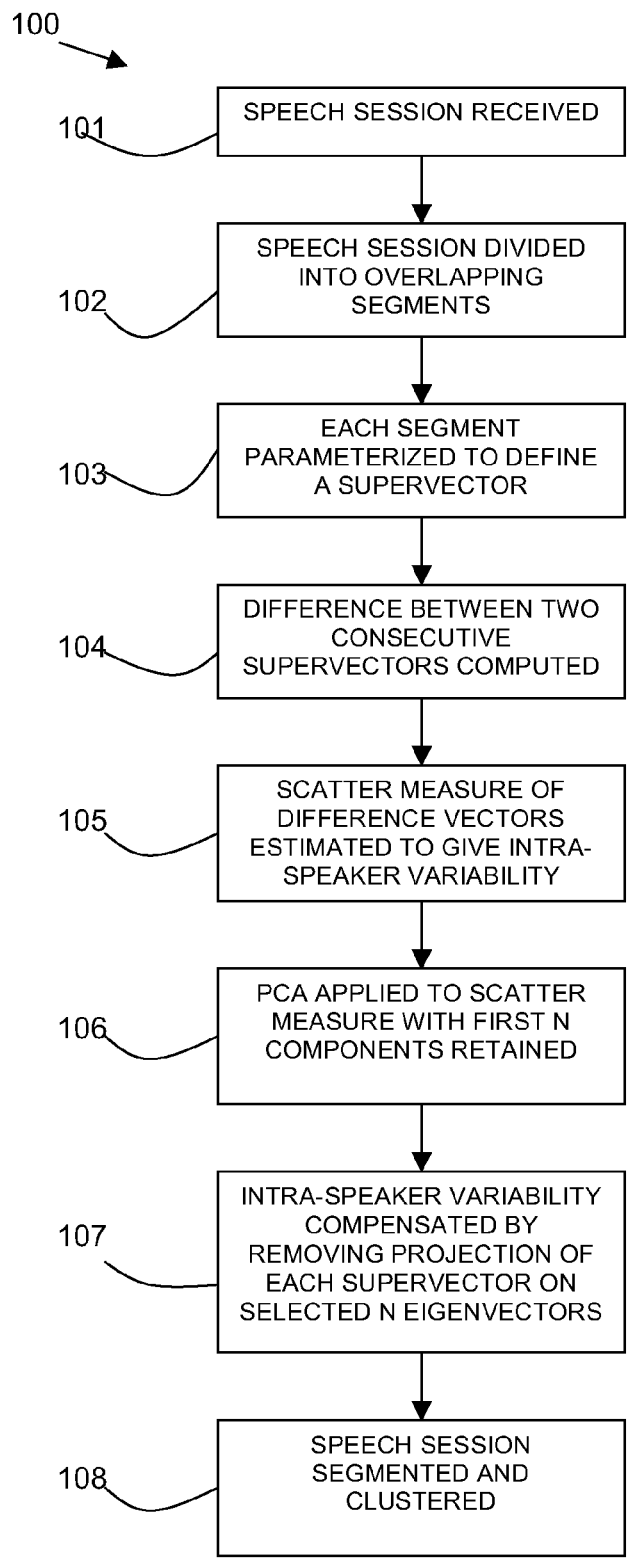
FIG. 1 is a flow diagram of a method of intra-speaker compensation in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A method, system and computer product are described to estimate the intra-speaker variability online without the need of any labelled training data. Intra-speaker variability is the variation of a speaker's output whilst still belonging to the same speaker.

Intra-speaker variability is modeled in an unsupervised manner on-the-fly and compensated for, enabling speaker identity change to be more accurately determined. Intra-speaker variability is estimated directly from the speakers of the processed session and is therefore speaker-dependent.

Intra-speaker variability can be modeled by exploiting the fact that in such a time series, it can be assumed that speaker identity change is a relatively slow varying process compared to intra-speaker variability. Therefore, working in a suitable resolution can capture the intra-speaker variability.

Unsupervised estimation of intra-speaker variability is possible by exploiting the following assumption. It is assumed that the characteristics of speakers change typically faster than the typical pace of speaker identity change (speaker turns). If an analysis window is chosen short enough to assume it contains only a single speaker (with high probability), intra-speaker variability can be estimated from the observed variability in the analysis window.

Audio is parameterized by a sequence of supervectors representing overlapping short segments of speech. A supervector is a high-dimensional vector. Session dependent intra-session intra-speaker variability is estimated online in an unsupervised manner, and is removed from the supervectors using Nuisance Attribute Projection (NAP) which is an standard technique for removing a nuisance subspace from a feature space.

In one embodiment, the supervectors are then projected using principal component analysis (PCA) into a one-dimensional space (for the two speaker case). Viterbi decoding is used to find an optimal segmentation using the projected supervectors as estimates for log-likelihood ratios. Finally, GMMs are estimated for each speaker and Viterbi re-segmentation is used to refine the segmentation.

This description focuses on speaker segmentation and speaker clustering for conversational speech between two speakers, but the methods developed can be useful for other domains such as broadcast and meetings.

Referring to FIG. 1, a flow diagram 100 shows an embodiment of a method of intra-speaker variability compensation.

A speech session is received 101 for speaker diarization. The speech session is evenly divided 102 into segments of duration x (typically in the range of 0.5-5 seconds) with an optional overlap of y (typically in the range of 0-90%). The duration x of the segments is chosen to be shorter than a typical speaker identity change and long enough to capture intra-speaker variability. For example, the duration x may be 1 second with the overlap of y as 90%.

Each segment is parameterized 103 by a time dependent probability density function (PDF) to define a supervector space. In one embodiment, a GMM-supervector framework is used. A GMM-supervector is a common representation for speech sessions in speaker recognition which is a high-dimensional vector.

The difference between each two consecutive supervectors is computed 104. The covariance matrix or any other scatter measure of these difference-vectors is estimated 105 and is actually the estimate of intra-speaker variability in this particular spoken session.

In one embodiment, PCA (Principal Component Analysis) is applied 106 to the scatter measure (for example, the covariance matrix) and only the first n components are retained (for example, a typical range of n is 1-100).

In order to compensate intra-speaker variability, each original supervector is compensated 107 by removing the projection of each original supervector on the selected n eigenvectors. For example, n=10. This technique is called NAP—Nuisance Attribute Projection.

After compensation, the audio is segmented and clustered 108 by using any available algorithm such as BIC-segmentation and bottom-up clustering, variational bayes based segmentation and clustering, GLR (generalized likelihood-ratio) based segmentation and clustering, etc.

In one embodiment, a combined joint segmentation and clustering algorithm is used in which the covariance matrix of the GMM-supervectors is computed (note: not the difference vectors) and the segments clustered according to the projection on the largest eigenvector of that covariance matrix.

The Model

A speaker S is modelled in a particular session with a dynamic generative process represented by a time-dependent probability density function (PDF) $S_t$. $S_t$ represents the PDF (GMM in practice) used to generate the observation at time t. Assuming a memory-less generative process, a speaker in a given session is modeled by a single PDF over the GMM space. This is contrary to advanced speaker-recognition approaches which model a speaker in a given session with a single GMM. The randomness introduced by the PDF is a result of intra-session intra-speaker variability.

A GMM-supervector framework is followed to define a supervector space. The supervector space is induced by a universal background model (UBM) trained for the currently processed session using standard EM (Expectation-Maximization) training. Restricting all GMMs to be adapted from the UBM, every GMM is mapped to the supervector space by concatenating the means of the GMM in a fixed order.

In the supervector space, it is assumed that the supervector $s_t$ (in time t) is a sum of three independent random supervectors as shown in Equation (1).

$$s_t = s + ux_t + dz_t \qquad (1)$$

Supervector s is the expectation of the PDF of speaker S in the supervector space, u is a rectangular matrix of low rank which is the intra-speaker covariance matrix (assumed to be of low rank). Random supervector $x_t$ has a standard normal distribution and its components represent instantaneous intra-speaker factors. Matrix d is a diagonal covariance matrix which models residual intra-speaker variability not captured by the low rank subspace of u. Random supervector $z_t$ has a standard normal distribution and its components represent instantaneous residual intra-speaker factors. It is assumed that covariance matrices u and d are speaker independent. However, they are estimated independently for every session.

Speaker supervector s is assumed to be drawn from a speaker population and distributes according to Equation (2);

$$s = m + vy \qquad (2)$$

where m is the UBM supervector, v is a rectangular matrix which is the inter-speaker covariance matrix. Random supervector y has a standard normal distribution and its components represent speaker factors.

It is assumed that the intra-speaker variability subspace induced by matrix u and the speaker-space induced by v are disjoint. Other than that, matrix v is not estimated and speaker-space information is not used. This is contrary to previous works that have used speaker factors for speaker diarization. The motivation for this assumption is that it enables development of an algorithm that does not require any development data for estimating the inter-speaker covariance matrix.

Estimating the Instantaneous GMM Supervectors ($s_t$)

Referring to step 103 of FIG. 1, in order to estimate the GMM-supervector at frame t, a duration threshold δ is set and it is assumed that during the segment [t−δ/2, t+δ/2] there is no speaker change and that the GMM distribution $S_t$ does not change significantly during the segment. Supervector $s_t$ is estimated using standard MAP (Maximum A-Posteriori)— adaptation of the UBM (assuming intra-speaker covariance matrix u=0). Alternatively other estimation methods such as factor analysis may be used. Although this approach is less accurate, it is simpler and more efficient in terms of run-time.

Estimating the Intra-Speaker Covariance Matrices (u, d)

Referring to steps 104 and 105 of FIG. 1, given a sequence of GMM-supervectors $s_1, \ldots, s_T$ estimated for a session of length T (frames), $\epsilon_t$ is defined as the difference of two consecutive supervectors ($\epsilon_t = s_{t+1} - s_t$). The expectation of $\epsilon_t$ equals to zero due to symmetry, which leads to Equation (3):

$$\text{cov}(\epsilon_t) = E(\epsilon_t \epsilon_t^t) \qquad (3)$$

Defining t* as the set of frames where a speaker change occurs (between frames t and t+1), the following expression is obtained:

$$E(\varepsilon_t \varepsilon_t^t) = Pr(t^*) E_{t \in t^*}(\varepsilon_t \varepsilon_t^t) + (1 - Pr(t^*)) E_{t \notin t^*}(\varepsilon_t \varepsilon_t^t) \qquad (4)$$
$$= 2[Pr(t^*)vv^t + uu^t + d^2]$$

Assuming that the prior probability of a speaker change in an arbitrary frame is small ($Pr(t^*) \ll 1$):

$$\frac{1}{2} E(\varepsilon_t \varepsilon_t^t) \cong uu^t + d^2 \qquad (5)$$

The value of $Pr(t^*)$ is a function of the expected speaker turn length (L) and segment length (δ), $$Pr(t^*) = \frac{\delta/2}{L - \delta/2} \qquad (6)$$

For conversational speech, L is in the order of 3 sec, δ is set to 1 sec. $Pr(t^*)$ would hence be equal to 0.2. The approximation used for deriving Equation (5) is therefore reasonable.

In conclusion, intra-speaker variability can be approximately estimated as half of the empirical covariance matrix of the difference supervectors $\{\epsilon_t\}$. Decomposition of the intra-speaker variability into matrices u and d may be done using standard techniques such as principal component analysis (PCA) or probabilistic PCA.

Referring to step 106 of FIG. 1, in one embodiment, PCA is applied to the intra-speaker variability covariance matrix and the eigenvectors used corresponding to the largest eigenvalues to form matrix u. Matrix d is estimated as a scalar matrix from the residual of the empirical intra-speaker variability covariance matrix, after removing the low rank subspace spanned by matrix u.

Intra-Speaker Variability Compensation

Referring to step 107 of FIG. 1, given a sequence of GMM-supervectors $s_1, \ldots, s_T$ estimated for a session of length T (frames), the intra-speaker covariance matrices (u, d) are first estimated. The supervector-subspace induced by u which is assumed to be disjoint from the inter-speaker subspace (induced by v) can be compensated by removing the projection of a supervector $s_t$ onto the subspace induced by u.

$$c_t = (I - \tilde{u}\tilde{u}^t) s_t \qquad (7)$$

In Equation (7) $\tilde{u}$ is a matrix that consists of the eigenvectors of matrix u, and $c_t$ is the resulting compensated supervector. The residual intra-speaker variability is not compensated as it is not disjoint to the inter-speaker space.

Segmentation and Clustering

Referring to step 108 of FIG. 1, after intra-speaker variability compensation, the audio can be segmented and clustered using any available algorithm.

In one embodiment, a joint segmentation and clustering algorithm is described for two-speaker sessions. The algorithm is based on GMM-supervector parameterization of short segments (for example, 1 second long). After intra-speaker variation is compensated, it is assumed that the dominant source of variability in the supervector-space is the speaker identity. The covariance matrix of the compensated supervectors is calculated and the eigenvector corresponding to the largest eigenvalue is used to simply classify the segments into the speaker identity.

In a one-pass method, in one embodiment, each speaker may be modelled by a 50-state HMM. The compensation order may be selected, for example, between 0 and 50, and a GMM order may be selected of 8, 16, 32, 64, 128. Good results are achieved with a compensation order of 25 and a GMM order of 128.

In a two-pass method with two iterations of Viterbi segmentation following the first pass, good results are achieved with a compensation order of 25 and with a GMM order of 64 for the first pass and GMM orders of 32 and 64 for the second pass.

Figure 2:
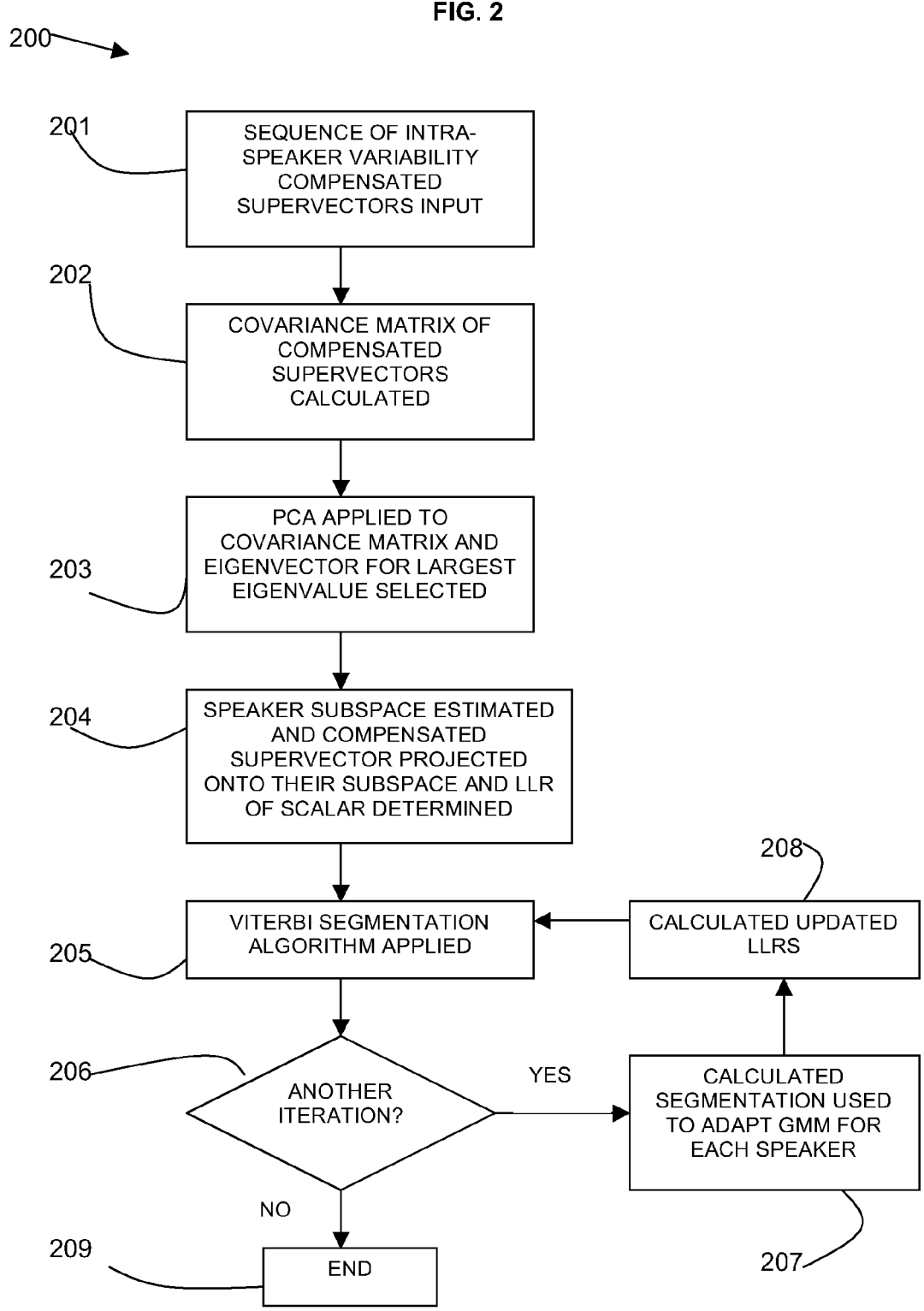
FIG. 2 is a flow diagram of a method of diarization in accordance with the present invention.

Referring to FIG. 2, a flow diagram shows one embodiment of segmentation and clustering after compensation for intra-speaker variability.

A sequence of intra-speaker variability compensated GMM supervectors is input 201. The covariance matrix of the compensated supervectors is calculated 202. PCA is applied to the total residual variability covariance matrix and the eigenvector corresponding to the largest eigenvalue is selected 203.

A one-dimensional speaker-subspace is estimated and the compensated supervectors are projected onto their subspace resulting in scalars. The log-likelihood ration (LLR) of a scalar is determined 204 and used by a Viterbi segmentation algorithm 205 that models each speaker by a hidden Markov model (HMM) to find the maximum likelihood segmentation.

A subsequent pass using Viterbi re-segmentation is carried out in one embodiment. The calculated segmentation is used to adapt 206 a single GMM for each speaker and the adapted GMMs are used to calculate 207 updated LLRs which are used by the Viterbi segmentation algorithm 205. This loop of adaptation 206 and segmentation 205 is iterated for several iterations.

The following is a more detailed description of the two-speaker diarization method of FIG. 2.

Given a sequence of intra-speaker variability compensated GMM-supervectors $c_1, \ldots, c_T$ estimated for a session of length T, the total residual variability is defined as cov($c_t$). The total residual variability of the compensated supervectors $c_t$ is a sum of two components. The first component is due to inter-speaker variability (the existence of more than one speaker in the session—vy in Equation 2). The second component is the residual intra-speaker variability ($dz_t$ in Equation 1). Taking in mind that only two speakers exist in the session, the inter-speaker variability is contained in a one-dimensional subspace. In general, for k speakers, the inter-speaker variability is contained in a k-dimensional subspace. On the contrary, the residual intra-speaker variability does not have any significant projection on any single axis (because such projections have already been compensated). Therefore, applying PCA to the total residual variability matrix cov($c_t$) and selecting the eigenvector corresponding to the largest eigenvalue should result in a one-dimensional subspace that contains the speaker variability and some limited (hopefully insignificant) residual intra-speaker variability.

In practice the one-dimensional speaker-subspace is estimated and the compensated supervectors $c_1, \ldots, c_T$ projected onto this subspace resulting in scalars $b_1, \ldots, b_T$. Adding up the assumptions, the scalars corresponding to speaker k (k=0 or 1) follow the distribution in Equation (8):

$$b_t^k \sim N(p^t(s_k - \alpha s_0 - (1-\alpha)s_1); \eta^2) \quad (8)$$

where $s_k$ stands for the speaker supervector (s in Equation 1) for speaker k, and $\alpha$ stands for the fraction of frames spoken by speaker 0. Note that the PCA is applied after removing the supervectors mean. The log-likelihood ratio (LLR) for an observed scalar $b_t$ (given speakers 0 and 1) can be expressed as:

$$\log \frac{Pr(b_t \mid 0)}{Pr(b_t \mid 1)} = \frac{p^t(s_0 - s_1)b_t + \left(\alpha - \frac{1}{2}\right)p^t(s_0 - s_1)p^t(s_0 + s_1)}{\eta^2} \quad (9)$$

which is a linear function of the observed scalar $b_t$. The LLR described in Equation (9) is used by a Viterbi segmentation algorithm that models each speaker by a hidden Markov model (HMM). The transition probabilities are derived from the average speaker turn length, and minimal speaker length is enforced by using an appropriate HMM topology. The estimated value of matrix d is used to calibrate the LLR. In experimental results $\alpha$ is fixed to the value of 0.5 which simplifies Equation (9) into:

$$\log \frac{Pr(b_t \mid \#0)}{Pr(b_t \mid \#1)} = \frac{p^t(s_0 - s_1)b_t}{\eta^2} \quad (10)$$

Furthermore, the values of $s_0$ and $s_1$ are set to $\psi$ and $-\psi$ respectively, where $\psi$ is set to a uniform vector $(\gamma, \ldots, \gamma)$ which is tuned on a held out development dataset. In summary, the observed scalars $\{b_t\}$ are calibrated to LLRs using a single parameter ($\gamma$).

The Viterbi algorithm is used to find a maximum likelihood (ML) segmentation using the HMM topology, the transition probabilities and the calibrated LLRs.

Viterbi Re-Segmentation

The first pass described in the previous subsection is post-processed by a second pass: Viterbi re-segmentation. In one embodiment, the second pass does not use intra-speaker variability compensation. Instead, the calculated segmentation is used to MAP-adapt a single GMM for each speaker using the original frame based feature vectors. The adapted GMMs are used to calculate updated LLRs which are used by the same Viterbi-based segmenter described in the previous subsection. The adaptation-segmentation scheme is iterated for several iterations.

The described segmentation uses PCA in the GMM-supervector space followed by Viterbi smoothing. Applying such techniques with a final Viterbi re-segmentation pass obtains good accuracy without needing to use conventional approaches which may require setting thresholds and may be sensitive to noise.

Figure 3:
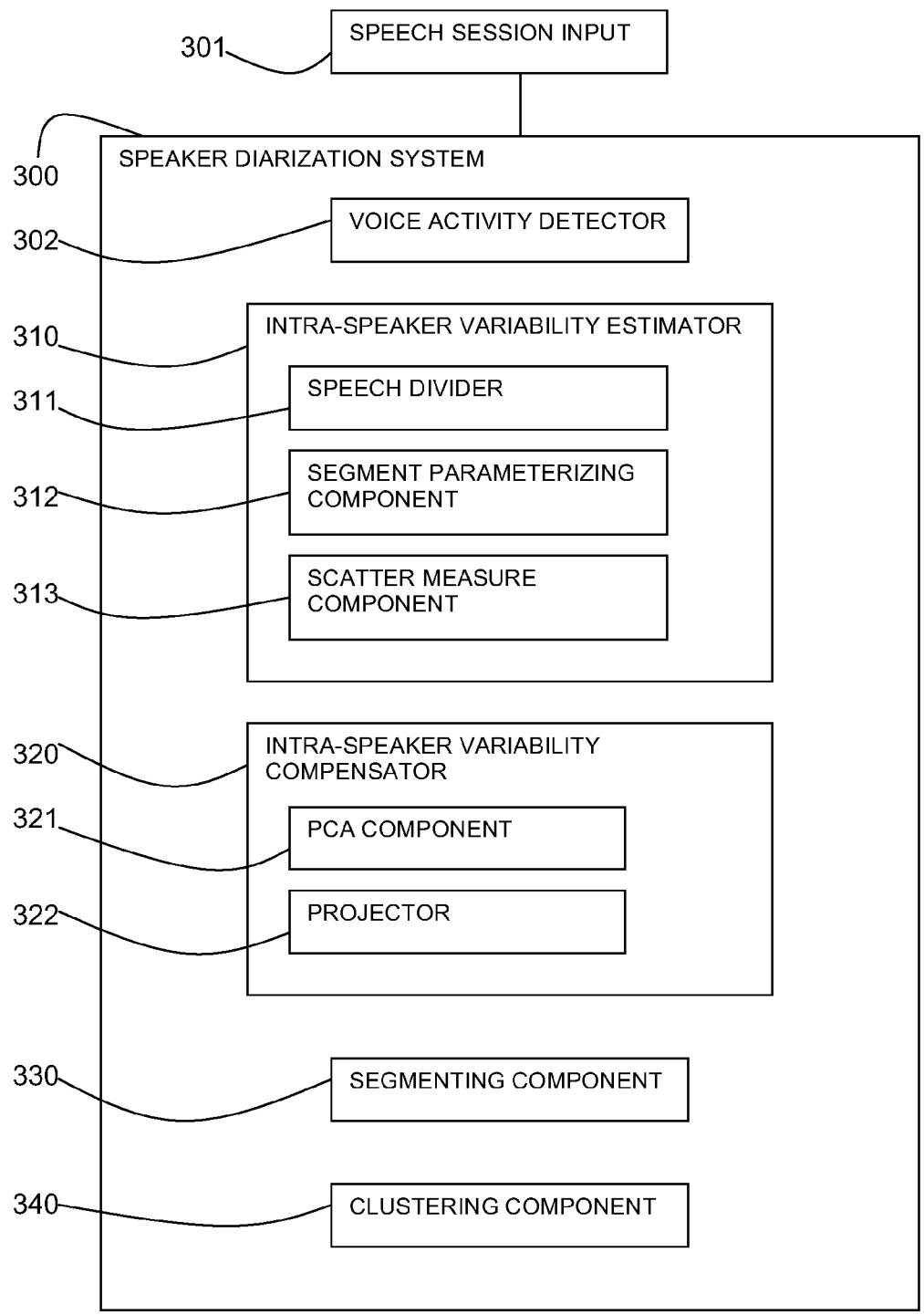
FIG. 3 is a block diagram of a diarization system in accordance with the present invention.

Referring to FIG. 3, a block diagram shows a system of speaker diarization including an intra-speaker variability compensator mechanism.

A speaker diarization system 300 is provided with a speech input 301. An adaptive energy based voice activity detector 302 may be included in the system 300 to locate and remove non-speech frames.

An intra-speaker variability estimator 310 is provided. The estimator 310 includes a speech divider 311 for dividing the speech input into overlapping segments and a segment parameterizing component 312 which outputs supervectors for each segment. A scatter measure component 313 includes algorithms to compute the difference between consecutive segment supervectors and calculate their scatter, for example by calculating a covariance matrix. The covariance matrix is output from the estimator 310 as the estimate of intra-speaker variability.

An intra-speaker variability compensator 320 is provided. The compensator 320 takes as its input the estimator output. The compensator 320 includes a PCA component 321 which applies PCA to the covariance matrix and retains n components. The compensator 320 includes a projector 322 which applies NAP by compensating each original supervector by removing its projection on the first n eigenvectors.

A segmenting component 330 and a clustering component 340 use the compensated results.

Figure 4:
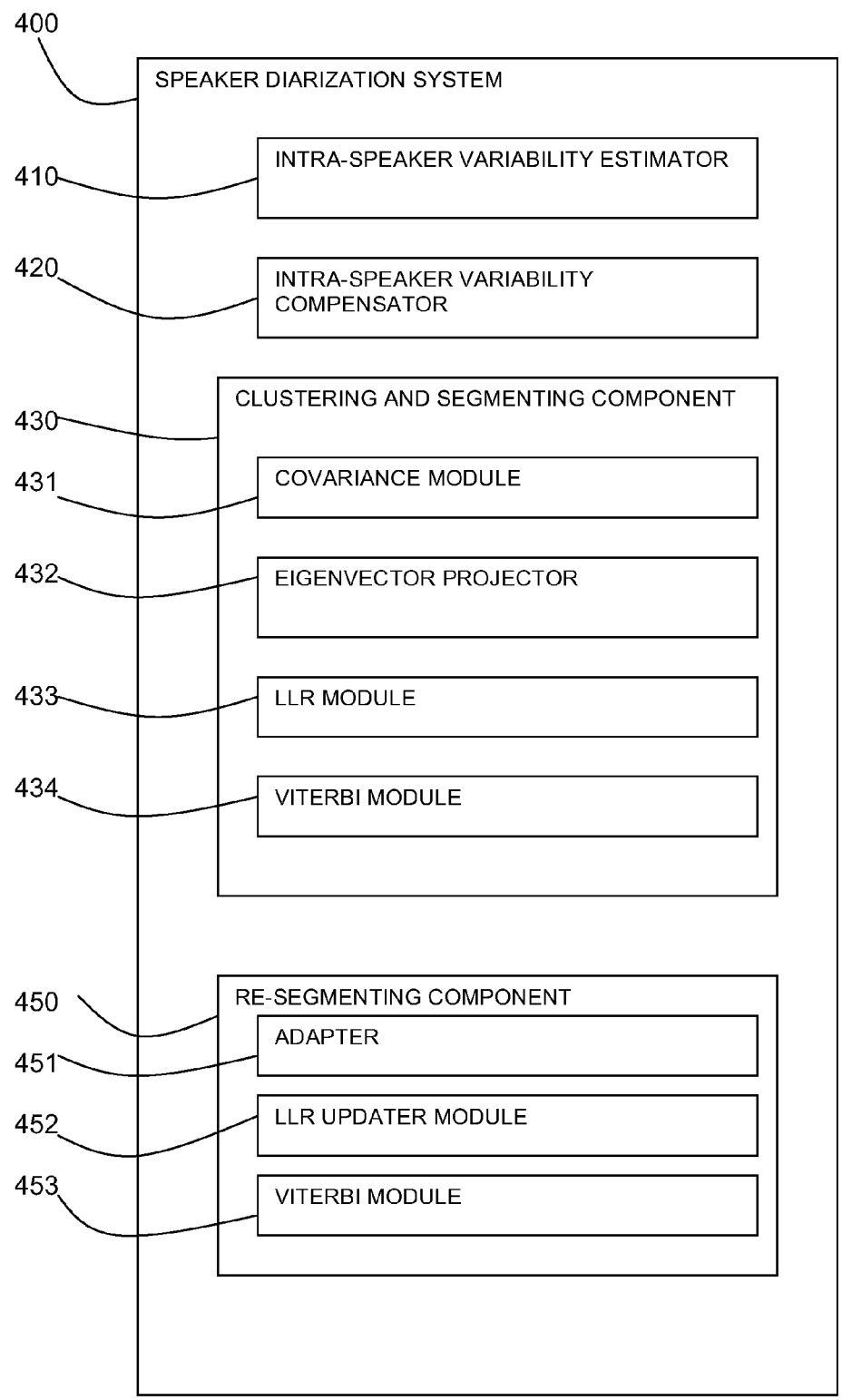
FIG. 4 is a block diagram of a diarization system in accordance with the present invention.

Referring to FIG. 4, a block diagram shows a diarization system 400 with an example embodiment of a combined segmenting and clustering module 430 and an optional re-segmenting module 450.

The diarization system 400 includes an intra-speaker variability estimator 410 and compensator 420 as shown in FIG. 3.

The combined segmenting and clustering module 430 includes: a covariance module 431 for calculating the covariance matrix of the compensated supervectors; an eigenvector projector 432 in which an eigenvector corresponding to the largest eigenvalue is used to classify segments by speaker; a LLR module 433; and a Viterbi module 434 for applying the Viterbi segmentation algorithm.

A re-segmenting component 450 is provided with an adapter 451 for adapting GMMs for each speaker, a LLR updater module 452, and a Viterbi re-segmentation module 453.

The front-end of the diarization system 300, 400 is based on of Mel-frequency cepstrum coefficients (MFCC). An adaptive energy based voice activity detector 301 may be used to locate and remove non-speech frames. The final feature set consists of 13 cepstral coefficients extracted every 10 ms using a 25 ms window. The use of feature warping (with a 300 frame window) and adding delta MFCC features is also possible.

Figure 5:
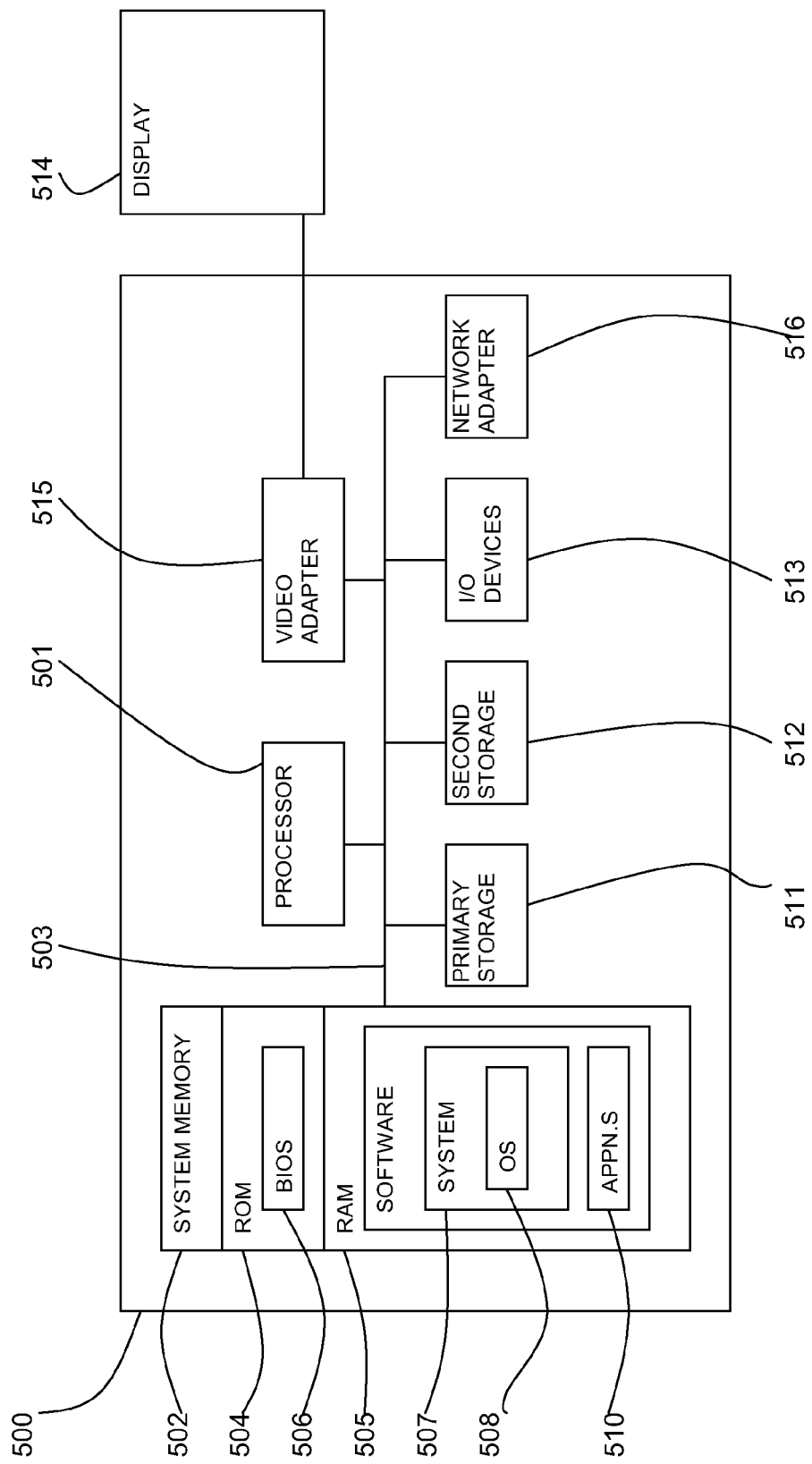
FIG. 5 is a block diagram of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements can include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 can be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

Intra-speaker variability estimation and compensation in speaker diarization may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for speaker diarization, comprising:
dividing a speech session, including speech from a plurality of different speakers, into segments of duration less than an average duration between speaker change;
parameterizing each segment by a time dependent probability density function supervector;
computing a difference between successive segment supervectors;
computing a scatter measure of the difference as an estimate of intra-speaker variability;
calculating, for the segment supervectors, respective compensated supervectors from which the estimated intra-speaker variability is removed; and
segmenting the speech session into segments considered to have different speaker identity, based on the compensated supervectors,
wherein said steps are implemented in either:
computer hardware configured to perform said dividing, parameterizing and computing steps, or
computer software embodied in a non-transitory, tangible, computer-readable storage medium.

2. The method as claimed in claim 1, wherein parameterizing each segment by a time dependent probability density function supervector uses a Gaussian Mixture Model supervector.

3. The method as claimed in claim 1, wherein computing a scatter measure of the difference as an estimate of intra-speaker variability computes a covariance matrix of the difference.

4. The method as claimed in claim 1, wherein dividing a speech session into segments divides the speech session into overlapping segments.

5. The method as claimed in claim 1, wherein calculating compensated supervectors comprises:
applying a principal component analysis on the scatter measure and selecting the first n eigenvectors;
removing from each supervector, the projection of the supervector on the selected n eigenvectors.

6. The method as claimed in claim 1, including clustering the segments considered to have different speaker identity into clusters of segments believed to have the same speaker identity, based on the compensated supervectors.

7. The method as claimed in claim 6, wherein the clustering includes:
computing a covariance matrix of the compensated supervectors; and
clustering the segments according to the projection on a largest eigenvector of that covariance matrix.

8. The method as claimed in claim 6, including applying a Viterbi segmenting algorithm to the speech session.

9. The method as claimed in claim 8, including applying a subsequent re-segmenting Viterbi algorithm including adapting a model for each speaker based on the previous segmentation.

10. A computer program product for speaker diarization, the computer program product comprising:
a computer readable storage medium having computer readable program code embodied therewith, the computer readable program code comprising:
computer readable program code configured to:
receive a speech session, including speech from a plurality of different speakers;
divide the speech session into segments of duration less than an average duration between speaker change;
parameterize each segment by a time dependent probability density function supervector;
compute a difference between successive segment supervectors;
compute a scatter measure of the difference as an estimate of intra-speaker variability; and
segment the speech session into segments considered to have different speaker identity, using the estimated intra-speaker variability,
wherein the computer readable program code is additionally configured to calculate, for the segment supervectors, respective compensated supervectors from which the estimated intra-speaker variability is removed and wherein the segmenting of the speech session into segments is based on the compensated supervectors.

11. A system for speaker diarization, comprising:
an input interface for receiving a speech session including speech from a plurality of different speakers; and
a processor configured to estimate intra-speaker variability from a speech session received through the input interface, and to segment the speech session received through the input interface into segments considered to have different speaker identity, using the estimated intra-speaker variability,
wherein the processor is configured to estimate the intra-speaker variability from the speech session by dividing the speech session into segments, parameterizing each segment by a time dependent probability density function supervector and computing an estimate of intra-speaker variability from the supervectors,
wherein the processor computes an estimate of intra-speaker variability from the supervectors by computing a difference between successive segment supervectors and computing a scatter measure of the difference, which serves as an estimate of intra-speaker variability,
wherein the processor is configured to segment the speech session by compensating the speech session for intra-speaker variability using the estimated intra-speaker variability and to segment the speech session based on the compensated speech session.

12. The system of claim 11, wherein the segments have a duration less than an average duration between speaker change.

13. The system of claim 11, wherein the processor is configured to compensate the speech session for intra-speaker variability by applying principal component analysis on the scatter measure and selecting the first n eigenvectors and for removing the projection of each supervector on the selected n eigenvectors.

14. The system of claim 11, wherein the parameterizing by a time dependent probability density function supervector comprises parameterizing by a Gaussian Mixture Model supervector.

15. The system of claim 11, wherein the dividing of the speech session into segments comprises dividing into overlapping segments.

16. A system for speaker diarization, comprising:
an input interface for receiving a speech session including speech from a plurality of different speakers; and a processor configured to estimate intra-speaker variability from a speech session received through the input interface, and to segment the speech session received through the input interface into segments considered to have different speaker identity, using the estimated intra-speaker variability, wherein the processor is configured to estimate the intra-speaker variability from the speech session by dividing the speech session into segments, parameterizing each segment by a time dependent probability density function supervector and computing an estimate of intra-speaker variability from the supervectors, and wherein the processor is configured to segment the speech session by calculating, for the segment supervectors, respective compensated supervectors from which the estimated intra-speaker variability is removed and segmenting the speech session into segments considered to have different speaker identity, based on the compensated supervectors.

17. The system of claim 16, wherein the processor computes an estimate of intra-speaker variability from the supervectors by computing a difference between successive segment supervectors and computing a scatter measure of the difference, which serves as an estimate of intra-speaker variability.

18. The system of claim 17, wherein computing a scatter measure of the difference comprises computing a covariance matrix of the difference.

19. The system of claim 17, wherein the processor is configured to segment the speech session by compensating the speech session for intra-speaker variability using the estimated intra-speaker variability and to segment the speech session based on the compensated speech session.

20. The system of claim 16, wherein the processor is further configured to cluster the segments considered to have different speaker identity into clusters of segments believed to have the same speaker identity, based on the compensated supervectors.

* * * * *